US012745125B2

(12) United States Patent
Wang et al.

(10) Patent No.: US 12,745,125 B2
(45) Date of Patent: Sep. 22, 2026

(54) DATA TRANSMISSION METHOD AND APPARATUS, TERMINAL DEVICE, NETWORK-SIDE DEVICE AND CHIP

(71) Applicant: Beijing Xiaomi Mobile Software Co., Ltd., Beijing (CN)

(72) Inventors: Deqian Wang, Beijing (CN); Shui Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 477 days.

(21) Appl. No.: 18/049,974

(22) Filed: Oct. 26, 2022

(65) Prior Publication Data

US 2024/0040425 A1 Feb. 1, 2024

(30) Foreign Application Priority Data

Jul. 29, 2022 (CN) ......................... 202210908657.2

(51) Int. Cl.
*H04W 28/02* (2009.01)
*H04B 17/318* (2015.01)
*H04L 47/41* (2022.01)

(52) U.S. Cl.
CPC ...... *H04W 28/0236* (2013.01); *H04B 17/318* (2015.01); *H04L 47/41* (2013.01)

(58) Field of Classification Search
None
See application file for complete search history.

(56) References Cited

U.S. PATENT DOCUMENTS

2014/0213235 A1* 7/2014 Lou ........................ H04B 1/525 455/418
2017/0135125 A1* 5/2017 Buthler ..................... H04L 1/18
2018/0234878 A1* 8/2018 Anand .................. H04W 48/16
2021/0084488 A1* 3/2021 Sevindik ............. H04B 1/7143
2021/0368327 A1* 11/2021 Gao ...................... H04W 24/08
2022/0256410 A1* 8/2022 Zhang .................. H04W 76/19
2022/0303937 A1* 9/2022 Wu ......................... H04W 8/20
2023/0379743 A1* 11/2023 Hu .......................... H04W 4/50
2023/0397071 A1* 12/2023 Spapis ............. H04W 36/1443

FOREIGN PATENT DOCUMENTS

CN 112492694 A 3/2021
CN 114389651 A 4/2022
WO 2022041954 A1 3/2022
WO 2022078902 A1 4/2022
WO WO2022083327 A1 * 4/2022 ........... H04B 7/0413

* cited by examiner

*Primary Examiner* — Khaled M Kassim
*Assistant Examiner* — Ahmed Saifuddin
(74) *Attorney, Agent, or Firm* — McCoy Russell LLP

(57) ABSTRACT

A data transmission method, applied to the terminal device of a data transmission system includes: determining a data service scenario corresponding to the terminal device; obtaining a data transmission strategy corresponding to the data service scenario, the data transmission strategy being implemented by scheduling dual subscriber identity modules of the terminal device; and transmitting to-be-transmitted data to the network-side device according to the data transmission strategy.

16 Claims, 5 Drawing Sheets

DATA TRANSMISSION METHOD AND APPARATUS, TERMINAL DEVICE, NETWORK-SIDE DEVICE AND CHIP

CROSS REFERENCE TO RELATED APPLICATIONS

The present application claims priority to Chinese Application No. 202210908657.2 filed on Jul. 29, 2022. The entire contents of the above-listed application are hereby incorporated by reference for all purposes.

BACKGROUND

With the popularization of intelligent terminal devices, a growing number of functions can be implemented by the terminal devices. Most terminal devices support a Dual SIM Dual Active (DSDA) mode.

SUMMARY

The disclosure relates to the technical field of communication, in particular to a data transmission method and apparatus, a terminal device, a network-side device and a chip.

According to a first aspect of an embodiment of the disclosure, a data transmission method is provided. The data transmission method is applied to a terminal device of a data transmission system, and the data transmission system further includes a network-side device. The method includes:

- determining a data service scenario corresponding to the terminal device;
- obtaining a data transmission strategy corresponding to the data service scenario, the data transmission strategy being implemented by scheduling dual subscriber identity modules of the terminal device; and
- transmitting to-be-transmitted data to the network-side device according to the data transmission strategy.

According to a second aspect of an embodiment of the disclosure, a data transmission method is provided. The data transmission method is applied to a network-side device of a data transmission system, and the data transmission system further includes a terminal device and a data server. The method includes:

- obtaining a change situation of a data transmission strategy of the terminal device, the data transmission strategy changing with a scenario change of the terminal device and being implemented by scheduling dual subscriber identity modules of the terminal device; and
- transmitting target data obtained from the data server to the terminal device according to a changed data transmission strategy.

According to a third aspect of an embodiment of the disclosure, a terminal device is provided. The terminal device includes:

- a first processor; and
- a first memory for storing executable instruction of the first processor;
- the first processor is configured to execute the executable instruction to:
- determine a data service scenario corresponding to the terminal device;
- obtain a data transmission strategy corresponding to the data service scenario, the data transmission strategy being implemented by scheduling dual subscriber identity modules of the terminal device; and
- transmit to-be-transmitted data to the network-side device according to the data transmission strategy.

According to a fourth aspect of an embodiment of the disclosure, a network-side device is provided. The network-side device includes:

- a second processor; and
- a second memory for storing executable instruction of the second processor;
- The second processor is configured to execute the executable instruction, so as to implement the data transmission method provided in the second aspect.

According to a fifth aspect of an embodiment of the disclosure, a non-transitory computer-readable storage medium is provided, storing a computer program instruction. The program instruction implements the steps of the data transmission methods provided in the first aspect when executed by a processor.

According to a sixth aspect of an embodiment of the disclosure, a chip is provided, including a processor and an interface. The processor is used for reading an instruction, so as to execute the steps of the data transmission methods provided in the first aspect.

It should be understood that the above general description and the following detailed description are only illustrative and explanatory, and do not limit the disclosure.

BRIEF DESCRIPTION OF THE DRAWINGS

The accompanying drawings here are incorporated into and constitute part of the description, illustrate embodiments conforming to the disclosure, and are used together with the description to interpret the principles of the disclosure.

DETAILED DESCRIPTION

Examples will be described in detail, and the instances of the examples are represented in the accompanying drawings. When the following description involves the accompanying drawings, the same numerals in the different accompanying drawings represent the same or similar elements, unless otherwise indicated. The embodiments described in the following examples do not represent all embodiments consistent with the disclosure. On the contrary, the embodiments are just examples of apparatuses and methods consistent with some aspects of the disclosure as detailed herein.

With the popularization of dual-subscriber-identity-module terminal devices, the requirements of users for Dual SIM Dual Active (DSDA) is increasing, and various DSDA modes are continuously introduced, such as a Dual SIM Dual Standby mode, a Dual SIM Single Pass mode and a Dual SIM Dual Pass mode, etc.

At present, when dual subscriber identity modules of a terminal device perform different services, different virtual private networks (VPNs) may be allocated to the dual subscriber identity modules, but it is difficult to find a scenario in which dual subscriber identity modules perform different services respectively in an actual situation. The main reason is that when the terminal device executes a data service, only one subscriber identity module (SIM) is used for a certain service usually, while the other SIM is idle.

In addition, according to an existing DSDA solution, in the situation of poor signal quality, problems such as time delay and a large packet loss rate are likely to occur, which will further cause problems such as stuck data loading when the terminal device transmits data.

In order to solve the problems in the related art, the disclosure provides a data transmission method and apparatus, a terminal device, a network-side device and a chip, which may not only improve flexibility of data transmission, but also reduce a time delay and a packet loss rate of data transmission.

Figure 1:
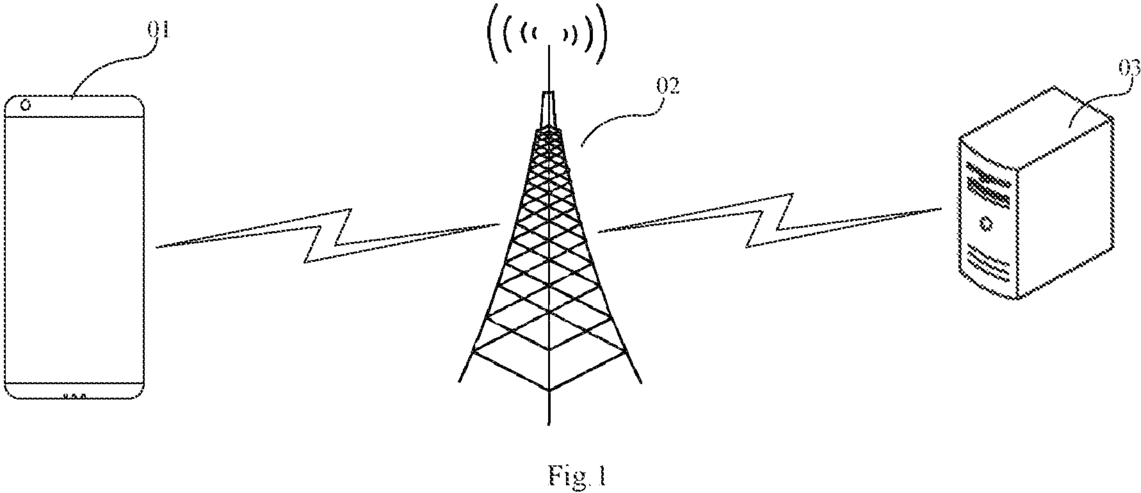
FIG. 1 shows a schematic diagram of application environment of a data transmission method according to an example.

An application environment of a data transmission method provided in an example will be described below. As shown in FIG. 1, the application environment may include a terminal device 01, a network-side device 02 and a data server 03. The terminal device 01 may be connected to the network-side device 02 in a wired or wireless manner, and the network-side device 02 may be connected to the data server 03 in a wired or wireless manner.

The terminal device 01 may be an user equipment (UE), a mobile station (MS) or a mobile terminal (MT), etc. Specifically, the terminal device 01 may be a mobile phone, a tablet computer or a computer with a wireless transmission-reception function, and may also be a virtual reality (VR) terminal, an augmented reality (AR) terminal, a wireless terminal in industrial control, a wireless terminal in unmanned driving, a wireless terminal in telemedicine, a wireless terminal in a smart grid, a wireless terminal in a smart city, a smart home, a vehicle terminal, etc.

In an example of the disclosure, an apparatus for implementing functions of the terminal device 01 may be a terminal device, or may be an apparatus capable of supporting the terminal device to implement the functions, for example a chip system (such as, a chip or a processing system composed of a plurality of chips). The data transmission method provided in an example of the disclosure will be described below with an example in which an apparatus for implementing functions of the terminal device is a terminal device 01.

The network-side device 02 may include an access network device (base station), and may also include a core network device. The network-side device 02 may be used for implementing functions, such as resource scheduling, radio resource management and radio access control of the terminal device 01. Specifically, the network-side device 02 may be any one of a small base station, a wireless access point, a transmission receive point (TRP), a transmission point (TP) and some other access nodes.

The data server 03 may receive uplink data obtained by the network-side device 02 from the terminal device 01, and forward, analyze and process the uplink data. In addition, the data server 03 may further transmit obtained to-be-transmitted downlink data to the network-side device 02, so as to forward the to-be-transmitted downlink data to the terminal device 01 by the network-side device 02.

Figure 2:
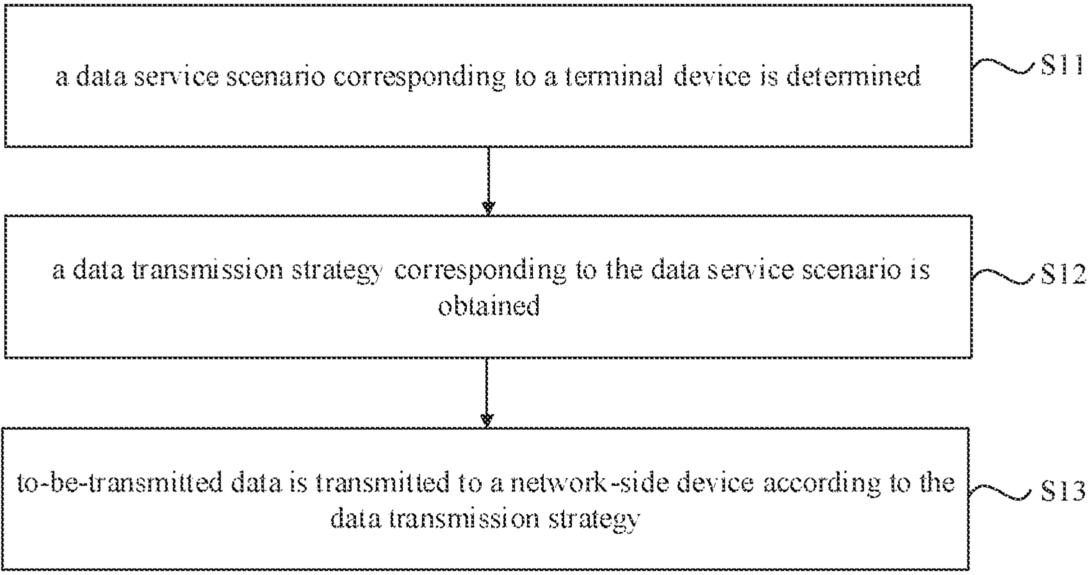
FIG. 2 shows a flow diagram of a data transmission method according to an example.

FIG. 2 shows a flow diagram of a data transmission method according to an example. As shown in FIG. 2, the data transmission method is applied to the terminal device in FIG. 1, and the method may include the following steps:

Step S11: a data service scenario corresponding to the terminal device is determined.

In an example of the disclosure, the terminal device may transmit uplink data to a network-side device, and may further receive downlink data transmitted by a data server from the network-side device, a transmission process of the uplink data and a transmission process of the downlink data are similar to each other, that is, a process for transmitting the uplink data by the terminal device to the data server and a process for transmitting the downlink data by the data server to the terminal device may be symmetrical, a data transmission process is illustrated with an example in which uplink data is transmitted by a terminal device to a data server in an example of the disclosure. In other words, to-be-transmitted data in an example of the disclosure may be uplink data.

In some implementations, the to-be-transmitted data may be service data associated with data service functions, or may be voice data associated with voice service functions. Data services generally refer to services implemented by a data communication network, such as services of browsing a web page, playing a network video, a network game, etc. Voice services generally refer to voice call services including a calling service, a called service, etc.

In other words, the to-be-transmitted data may be service data generated by running a browser, a video application or a game application by the terminal device. In addition, the to-be-transmitted data may be voice data, etc. generated when the terminal device executes call services.

In some examples, the to-be-transmitted data may be one data packet or a plurality of data packets, that is, the to-be-transmitted data may include a plurality of data packets. In addition, the to-be-transmitted data may be referred to as to-be-transmitted uplink data.

In some examples, the terminal device may determine a data service scenario corresponding to the terminal device when obtaining the to-be-transmitted data. The data service scenario may be used for representing current network quality of the terminal device. Since network quality of the terminal device is different, the data service scenarios corresponding thereto may also be different.

In an example of the disclosure, data service scenarios may include a first scenario, a second scenario or a third scenario. The first scenario may be further referred to as an edge scenario, and the terminal device is positioned at an edge of a cell in the first scenario. The second scenario may be further referred to as a middle scenario, and the terminal device is positioned between the edge and a center of the cell in the second scenario. The third scenario may be further referred to as a center scenario, and the terminal device is positioned at the center of the cell in the third scenario.

In addition, when the terminal device is in the first scenario, network quality corresponding thereto is the worst, when the terminal device is in the third scenario, network quality corresponding thereto is the best, and when the terminal device is in the second scenario, network quality corresponding thereto is between that of the first scenario and the third scenario.

In some examples, after obtaining the to-be-transmitted data, the terminal device may first obtain network quality information, and obtain a service scenario corresponding to the terminal device on the basis of the network quality information. If it is determined that the network quality of the terminal device is excellent, the data service scenario corresponding to the terminal device is determined to be the third scenario (center scenario). If it is determined that the network quality of the terminal device is poor, the data service scenario corresponding to the terminal device is determined to be the first scenario (edge scenario). If it is determined that the network quality of the terminal device is good, that is, the network quality of the terminal device is neither excellent nor poor, the data service scenario corresponding to the terminal device is determined to be the second scenario (middle scenario).

Step S12: a data transmission strategy corresponding to the data service scenario is obtained.

In some examples, according to the disclosure, after the data service scenario corresponding to the terminal device is obtained, the data transmission strategy corresponding to the data service scenario may be obtained. The data service scenario and the data transmission strategy may be pre-stored in the terminal device in a one-to-one correspondence relation, and the terminal device may obtain the data transmission strategy corresponding to the data service scenario by looking up a table.

In some examples, the data transmission strategy may be implemented by scheduling the dual subscriber identity modules of the terminal device. In addition, the data transmission strategies may include a dual-subscriber-identity-module diversity transmission strategy, a dual-subscriber-identity-module time-sharing transmission strategy and a dual-subscriber-identity-module parallel transmission strategy, and since the data transmission strategies are different, the corresponding solutions for transmitting to-be-transmitted data are different.

In an example of the disclosure, the terminal device may support a dual-subscriber-identity-module dual-pass function, that is, two SIM cards may be inserted into the terminal device at the same time, and the two SIM cards may be used at the same time. In addition, the two SIM cards may reside on the same network or on different networks. One SIM card may be set as a primary subscriber identity module SIM, that is, a primary card. The other SIM card is taken as a secondary subscriber identity module SIM, that is, a secondary card. The primary subscriber identity module SIM may be used for supporting data service functions, and both the primary subscriber identity module SIM and the secondary subscriber identity module SIM may support calling and called functions.

In an example of the disclosure, the dual subscriber identity modules of the terminal device may include a first subscriber identity module and a second subscriber identity module, the first subscriber identity module may be further referred to as a SIM1, and the may be a universal subscriber identity module (USIM) or an embedded subscriber identity module (eSIM), etc.

In other examples, the first subscriber identity module may be a primary card preset by a user, that is, the primary subscriber identity module SIM. In addition, the second subscriber identity module may be referred to as a SIM2, and the SIM2 may be a universal subscriber identity module or an eSIM card, etc.

Step S13: the to-be-transmitted data is transmitted to the network-side device according to the data transmission strategy.

It is known from the above introduction that the data transmission strategies may be implemented by scheduling the dual subscriber identity modules by the terminal device, but since the data transmission strategies are different, mechanisms for scheduling the dual subscriber identity modules by the terminal device are different. According to the disclosure, the corresponding data transmission strategy may be obtained according to a network condition of the terminal device, and the to-be-transmitted data may be transmitted to the network-side device according to the corresponding data transmission strategy. In this way, flexibility of data transmission may be improved to a great extent.

According to an example of the disclosure, by obtaining the data transmission strategy corresponding to the data service scenario, data may be more flexibly and effectively transmitted. Specifically, the terminal device may first determine a data service scenario corresponding to the terminal device, and obtain a data transmission strategy corresponding to the data service scenario, the data transmission strategy being capable of being implemented by scheduling the dual subscriber identity modules of the terminal device, and on this basis, the to-be-transmitted data is transmitted to the network-side device according to the data transmission strategy. According to the disclosure, by obtaining the corresponding data transmission strategy according to the data service scenario, flexibility of data transmission may be improved, and moreover, a time delay and a packet loss rate in a data transmission process may be reduced.

Figure 3:
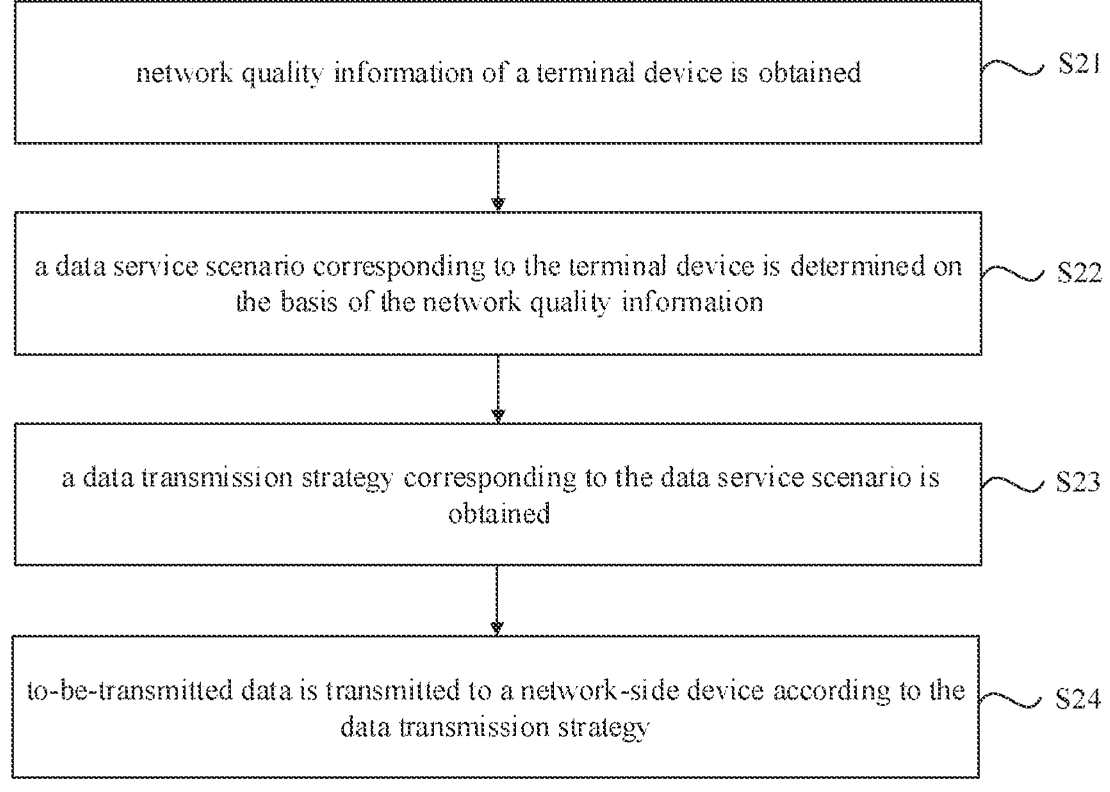
FIG. 3 shows a flow diagram of a data transmission method according to another example.

FIG. 3 shows a flow diagram of a data transmission method according to another example. As shown in FIG. 3, the data transmission method is applied to the terminal device shown in FIG. 1, and the method may include the following steps:

Step S21: network quality information of the terminal device is obtained.

In some examples, when obtaining detected to-be-transmitted data, the terminal device may obtain the network quality information of the terminal device. The network quality information of the terminal device may include reference signal received power (RSRP), and the RSRP may be RSRP corresponding to long term evolution (LTE) or RSRP corresponding to new radio (NR).

In other examples, when obtaining the RSRP, the terminal device may first determine a network with which the terminal device is connected, and obtain the RSRP corresponding to the network. As an example, in the case that the network with which the terminal device is connected is the fifth generation of mobile phone mobile communication technology standards (5G) network, the corresponding network quality information may be NR RSRP.

As another example, in the case that the network with which the terminal device is connected is the fourth generation of mobile phone mobile communication technology standards (4G) network, the corresponding network quality information may be LTE RSRP.

In addition, the network with which the terminal device is connected may be other networks such as the second generation of mobile phone mobile communication technology standards (2G) network or the third generation of mobile phone mobile communication technology standards (3G) network. The RSRP corresponding to the 2G network and the RSRP corresponding to the 3G network are also different. The specific RSRP corresponding to which network is not explicitly defined herein, and may be selected according to actual situations.

Step S22: a data service scenario corresponding to the terminal device is determined on the basis of the network quality information.

In some examples, according to the disclosure, after the network quality information of the terminal device is obtained, the data service scenario corresponding to the terminal device may be determined on the basis of the network quality information. Since the network quality information is different, the corresponding data service scenarios may also be different.

As a specific implementation, according to the disclosure, when the data service scenario corresponding to the terminal device is determined on the basis of the network quality information, it may be determined whether the network quality information RSRP is less than a first parameter threshold. If it is determined that the network quality information RSRP is less than the first parameter threshold, a first scenario is taken as the data service scenario corresponding to the terminal device. In the first scenario, the terminal device is positioned at an edge of a cell, that is, the scenario in which the terminal device is positioned at the edge of the cell may be referred to as the first scenario.

In an example of the disclosure, the first parameter threshold may be determined on the basis of a network with which the terminal device is currently connected. For example, in the case that the network with which the terminal device is currently connected is a 5G network, the first parameter threshold may be −105 dBm. For another example, in the case that the network with which the terminal is currently connected is a 4G network, the first parameter threshold may be −100 dBm. The first parameter threshold may be set according to an empirical value, or may be determined according to an actual network condition of a cell where the terminal device is positioned.

As an example, after it is determined through detection that the network with which the terminal device is currently connected is the 5G network, it is determined whether NR RSRP belongs to (−∞, −105) dBm (is less than the first parameter threshold) in this case, and if it is determined that the NR RSRP belongs to (−∞, −105) dBm, it is indicated that the terminal device is positioned at the edge of the cell, and in this case, the data service scenario corresponding to the terminal device is the first scenario.

As another example, after it is determined through detection that the network with which the terminal device is currently connected is the 4G network, it is determined whether LTE RSRP belongs to (−∞, −100) dBm (is less than the first parameter threshold) in this case, and if it is determined that the LTE RSRP belongs to (−∞, −100) dBm, it is indicated that the terminal device is positioned at the edge of the cell, and in this case, the data service scenario corresponding to the terminal device is the first scenario.

In addition, if it is determined that the network quality information RSRP is greater than or equal to the first parameter threshold, according to the disclosure, whether the network quality information RSRP is less than a second parameter threshold may be continuously determined, and if it is determined that the network quality information RSRP is greater than or equal to the first parameter threshold and less than the second parameter threshold, according to the disclosure, the second scenario may be taken as the data service scenario corresponding to the terminal device. In the second scenario, the terminal device is positioned between the edge and a center of the cell, that is, the scenario in which the terminal device is positioned between the edge and the center of the cell may be referred to as the second scenario.

In an example of the disclosure, similar to the first parameter threshold, the second parameter threshold may also be determined on the basis of a network with which the terminal device is currently connected. In addition, the second parameter threshold may be set according to an empirical value, or may be determined according to an actual network condition of a cell where the terminal device is positioned.

As an example, after it is determined through detection that the network with which the terminal device is currently connected is the 5G network, it is determined whether NR RSRP belongs to (−105, −85) dBm (is greater than or equal to the first parameter threshold and less than the second parameter threshold) in this case, and if it is determined that the NR RSRP belongs to (−105, −85) dBm, it is indicated that the terminal device is positioned between the edge and the center of the cell, and in this case, the data service scenario corresponding to the terminal device is the second scenario.

As another example, after it is determined through detection that the network with which the terminal device is currently connected is the 4G network, it is determined whether LTE RSRP belongs to (−100, −85) dBm (is greater than or equal to the first parameter threshold and less than the second parameter threshold) in this case, and if it is determined that the LTE RSRP belongs to (−100, −85) dBm, it is indicated that the terminal device is positioned between the edge and the center of the cell, and in this case, the data service scenario corresponding to the terminal device is the second scenario.

In some examples, if it is determined that the network quality information RSRP is greater than or equal to the second parameter threshold, according to the disclosure, a third scenario may be taken as the data service scenario corresponding to the terminal device. In the third scenario, the terminal device is positioned at the center of the cell, that is, the scenario in which the terminal device is positioned in the center of the cell may be referred to as the third scenario.

As an example, after it is determined through detection that the network with which the terminal device is currently connected is the 5G network, it is determined whether NR RSRP belongs to (−85, +∞) dBm (is greater than or equal to the second parameter threshold) in this case, if it is determined that the NR RSRP belongs to (−85, +∞) dBm, it is indicated that the terminal device is positioned at the center of the cell, and in this case, the data service scenario corresponding to the terminal device is the third scenario.

As another example, after it is determined through detection that the network with which the terminal device is currently connected is the 4G network, it is determined whether LTE RSRP belongs to (−85, +∞) dBm (is greater than or equal to the second parameter threshold) in this case, and if it is determined that the LTE RSRP belongs to (−85, +∞) dBm, it is indicated that the terminal device is positioned at the center of the cell, and in this case, the data service scenario corresponding to the terminal device is the third scenario.

In an example of the disclosure, in the first scenario, the terminal device is farthest from the network-side device (base station); in the third scenario, the terminal device is closest to the network-side device (base station); and in the second scenario, the terminal device is positioned between the edge and the center of the cell.

It should be noted that the network quality information in an example of the disclosure may further include a signal to noise ratio (SNR). When the data service scenario corresponding to the terminal device is determined on the basis of the network quality information, according to the disclosure, the data service scenario may be determined by at least one of the RSRP and the SNR. Specifically, the terminal device may determine the data service scenario corresponding to the terminal device by means of the RSRP, may determine the data service scenario corresponding to the terminal device by means of the SNR, or may comprehensively determine the data service scenario corresponding to the terminal device by means of the RSRP and the SNR.

In addition, the network quality information in an example of the disclosure may also include received signal strength indicator (RSSI), reference signal received quality (RSRQ) or other parameters for indicating network quality, and parameters included in the network quality information are not explicitly limited herein, and may be selected according to actual situations.

Step S23: a data transmission strategy corresponding to the data service scenario is obtained.

In some examples, in the case that the data service scenario obtained by the terminal device is the first scenario (edge scenario), the corresponding data transmission strategy may be a dual-subscriber-identity-module diversity transmission strategy. The dual-subscriber-identity-module diversity transmission strategy may transmit the same data by the first subscriber identity module and the second subscriber identity module, the network-side device preferentially transmits the data transmitted by the subscriber identity module and arriving at the network-side device first to the data server, and the data received later may be discarded.

In other examples, in the case that the data service scenario obtained by the terminal device is the second scenario (middle scenario), the corresponding data transmission strategy may be a dual-subscriber-identity-module time-sharing transmission strategy. The dual-subscriber-identity-module time-sharing transmission strategy is used to transmit data in turn by a better subscriber identity module selected from the first subscriber identity module and the second subscriber identity module, and if a network of the first subscriber identity module satisfies a first preset condition, a data service channel of the terminal device is changed from the first subscriber identity module to the second subscriber identity module.

In other examples, in the case that the data service scenario obtained by the terminal device is the third scenario (center scenario), the corresponding data transmission strategy may be a dual-subscriber-identity-module parallel transmission strategy. The dual-subscriber-identity-module parallel transmission strategy is used to transmit different data in parallel by the first subscriber identity module and the second subscriber identity module, so as to improve efficiency of data transmission.

Step S24: the to-be-transmitted data is transmitted to the network-side device according to the data transmission strategy.

In some examples, when transmitting the to-be-transmitted data to the network-side device according to the dual-subscriber-identity-module diversity transmission strategy, the terminal device may distribute the to-be-transmitted data to the first subscriber identity module and the second subscriber identity module respectively, transmit the to-be-transmitted data to the network-side device by the first subscriber identity module, and transmit the to-be-transmitted data to the network-side device by the second subscriber identity module. The network-side device may be used for transmitting the data first received to the data server.

In an example of the disclosure, the to-be-transmitted data distributed to the first subscriber identity module may be referred to as first to-be-transmitted data, and the to-be-transmitted data distributed to the second subscriber identity module may be referred to as second to-be-transmitted data.

Herein, the steps of distributing the first to-be-transmitted data to the first subscriber identity module and distributing the second to-be-transmitted data to the second subscriber identity module may include: configure a first label for the first to-be-transmitted data and configure a second label for the second to-be-transmitted data, the first label being used for guaranteeing that the first data to be transmit is received in sequence, and the second label being used for guaranteeing that the second to-be-transmitted data is received in sequence. On this basis, the first to-be-transmitted data for which the first label is configured is distributed to the first subscriber identity module, and the second to-be-transmitted data for which the second label is configured is distributed to the second subscriber identity module. In an example of the disclosure, the terminal device may include a data client module, such that when the first to-be-transmitted data and the second to-be-transmitted data are distributed to the first subscriber identity module and the second subscriber identity module, according to the disclosure, the first label may be configured for the first to-be-transmitted data by the data client module, and the second label may be configured for the second to-be-transmitted data by the data client module. In addition, the first to-be-transmitted data configured with the first label is distributed to the first subscriber identity module by the data client module, and the second to-be-transmitted data configured with the second label is distributed to the second subscriber identity module by the data client module. According to the disclosure, a time delay and a packet loss rate of data transmission may be effectively reduced through the dual-subscriber-identity-module diversity transmission strategy.

In other examples, when the terminal device transmits the to-be-transmitted data to the network-side device according to the dual-subscriber-identity-module time-sharing transmission strategy, the terminal device may distribute the to-be-transmitted data to the first subscriber identity module, and transmit the to-be-transmitted data to the network-side device by the first subscriber identity module, so as to instruct the network-side device to monitor the network of the first subscriber identity module. On this basis, if first switch instruction information transmitted by the network-side device is received, a first switch operation is executed. The first switch instruction information may be transmitted by the network-side device under the condition that the network-side device determines that the network of the first subscriber identity module satisfies the first preset condition. In addition, the first switch operation is used for changing a data service channel of the terminal device from the first subscriber identity module to the second subscriber identity module.

Herein, the step of transmitting the to-be-transmitted data to the first subscriber identity module includes: configure a label for the to-be-transmitted data, the label being used for guaranteeing that the to-be-transmitted data is received in sequence; and transmit the to-be-transmitted data for which the label is configured to the first subscriber identity module.

In an example of the disclosure, the first preset condition may include a condition that a first time delay of transmitting the to-be-transmitted data by the first subscriber identity module is greater than a preset time delay, and/or a condition that a first packet loss rate of transmitting the to-be-transmitted data by the first subscriber identity module is greater than a preset packet loss rate.

In some examples, after the first switch operation is executed, according to the disclosure, new to-be-transmitted data may be obtained, the new to-be-transmitted data is distributed to the second subscriber identity module, and the new to-be-transmitted data is transmitted to the network-side device by the second subscriber identity module. On this basis, if the terminal device receives a second switch instruction information transmitted by the network-side device, a second switch operation is executed. The second switch instruction information may be transmitted by the network-side device under the condition that the network-side device determines that a network of the second subscriber identity module satisfies a second preset condition. In addition, the second switch operation may be used for changing a data service channel of the terminal device from the second subscriber identity module to the first subscriber identity module.

Herein, the second preset condition may include a condition that a difference between a second time delay of transmitting the new to-be-transmitted data by the second subscriber identity module and the first time delay is greater than a first difference, and/or a condition that a difference between a second packet loss rate of transmitting the new to-be-transmitted data by the second subscriber identity module and the first packet loss rate is greater than a second difference.

In some examples, the terminal device may further configure a label for the to-be-transmitted data by a data client module, and distribute the to-be-transmitted data for which the label is configured to the first subscriber identity module by the data client module. According to the disclosure, the advantages of the dual subscriber identity modules may be fully utilized through the dual-subscriber-identity-module time-sharing transmission strategy, so as to reduce a transmission time delay and a packet loss rate.

In other examples, the to-be-transmitted data may include first to-be-transmitted data and second to-be-transmitted data. When the terminal device transmits the to-be-transmitted data to the network-side device according to the dual-subscriber-identity-module parallel transmission strategy, the terminal device may distribute the first to-be-transmitted data to the first subscriber identity module and distribute the second to-be-transmitted data to the second subscriber identity module. On this basis, the terminal device may transmit the first to-be-transmitted data to the network-side device by the first subscriber identity module, and transmit the second to-be-transmitted data to the network-side device by the second subscriber identity module. The network-side device is used for obtaining target data by merging the first to-be-transmitted data and the second to-be-transmitted data, and transmitting the target data to the data server.

Herein, when distributing the first to-be-transmitted data to the first subscriber identity module and distributing the second to-be-transmitted data to the second subscriber identity module, the terminal device may configure a first label for the first to-be-transmitted data and configure a second label for the second to-be-transmitted data. The first label and the second label are used for guaranteeing that the first to-be-transmitted data and the second to-be-transmitted data are received in sequence. On this basis, the first to-be-transmitted data for which the first label is configured is distributed to the first subscriber identity module, and the second to-be-transmitted data for which the second label is configured is distributed to the second subscriber identity module.

As described above, according to the disclosure, the first label may be configured for the first to-be-transmitted data by the data client module, and the second label may be configured for the second to-be-transmitted data by the data client module. The first to-be-transmitted data for which the first label is configured is distributed to the first subscriber identity module by the data client module, and the second to-be-transmitted data for which the second label is configured is distributed to the second subscriber identity module by the data client module.

In some examples, when distributing the first to-be-transmitted data to the first subscriber identity module and distributing the second to-be-transmitted data to the second subscriber identity module, the terminal device may distribute the first to-be-transmitted data to the first subscriber identity module and distribute the second to-be-transmitted data to the second subscriber identity module according to a preset rule.

Specifically, the steps of distributing the first to-be-transmitted data to the first subscriber identity module and distributing the second to-be-transmitted data to the second subscriber identity module according to a preset rule may include: if a size of a data packet of the first to-be-transmitted data is larger than that of a data packet of the second to-be-transmitted data, distribute the first to-be-transmitted data to the first subscriber identity module, and distribute the second to-be-transmitted data to the second subscriber identity module, network quality the first subscriber identity module being better than that of the second subscriber identity module.

In some examples, the step of distributing the first to-be-transmitted data to the first subscriber identity module and distributing the second to-be-transmitted data to the second subscriber identity module according to a preset rule may further include: priority of the first to-be-transmitted data and the second to-be-transmitted data is obtained. If the priority of the first to-be-transmitted data is higher than that of the second to-be-transmitted data, distribute the first to-be-transmitted data to the first subscriber identity module and distribute the second to-be-transmitted data to the second subscriber identity module, the network quality of the first subscriber identity module being better than that of the second subscriber identity module. According to the disclosure, according to a dual-subscriber-identity-module parallel transmission strategy, under the condition that it is guaranteed that the time delay and the packet loss rate are low, advantages of the dual subscriber identity modules may be fully utilized, and throughput may be improved.

Figure 4:
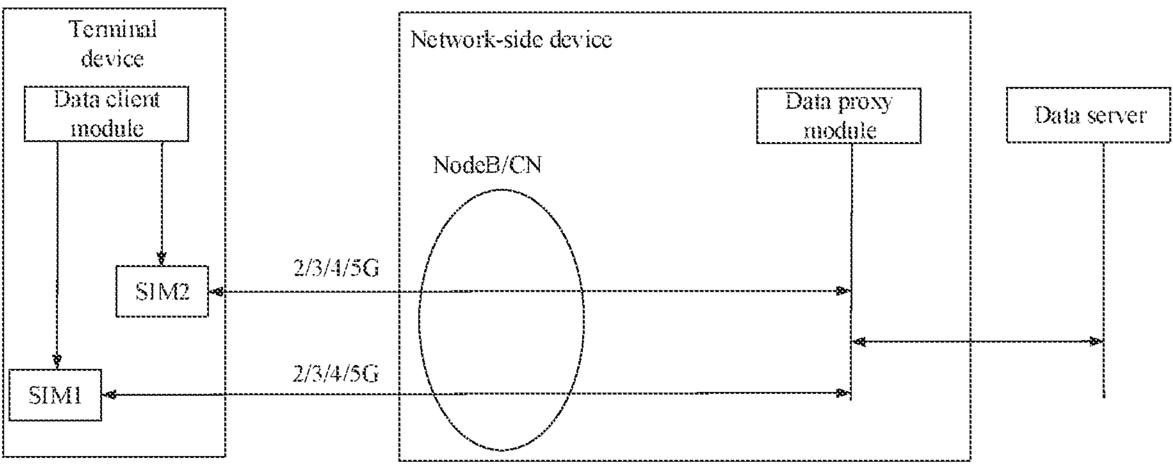
FIG. 4 shows an illustrative structural diagram of a data transmission system in a data transmission method according to an example.

In order to better understand a relation between the terminal device, the data client module, the first subscriber identity module (SIM1), the second subscriber identity module (SIM2), the network-side device, the data proxy module and the data server in the data transmission system, an illustrative diagram as shown in FIG. 4 is provided in an example of the disclosure. As shown in FIG. 4, the terminal device may include a data client module, a SIM1 (the first subscriber identity module) and a SIM2 (the second subscriber identity module).

In some examples, when transmitting the to-be-transmitted data to the network-side device according to the dual-subscriber-identity-module diversity transmission strategy, the terminal device may generate second to-be-transmitted data on the basis of the first to-be-transmitted data. The terminal device may configure a first label for the first to-be-transmitted data and configure a second label for the second to-be-transmitted data, and distribute the first to-be-transmitted data for which the first label is configured to the SIM1 (the first subscriber identity module), the SIM1 (the first subscriber identity module) being capable of a primary card, and distribute the second to-be-transmitted data for which the second label is configured to the SIM2 (the second subscriber identity module), the SIM2 (the second subscriber identity module) may be a secondary card.

On this basis, the terminal device may transmit the first to-be-transmitted data for which the first label is configured to the network-side device by the SIM1 (the first subscriber identity module), and transmit the second to-be-transmitted data for which the second label is configured to the network-side device by the SIM2 (the second subscriber identity module). If the data proxy module of the network-side device first receives the first to-be-transmitted data for which the first label is configured and that is transmitted by the terminal device by the SIM1 (the first subscriber identity module), the data proxy module may transmit the first to-be-transmitted data to the data server. If the data proxy module subsequently receives the second to-be-transmitted data the same as the first to-be-transmitted data that is transmitted by the SIM2 (the second subscriber identity module), the network-side device may directly discard the second to-be-transmitted data.

Similarly, if the data proxy module of the network-side device first receives the second to-be-transmitted data for which the second label is configured and that is transmitted by the terminal device by the SIM2 (the second subscriber identity module), the data proxy module may transmit the second to-be-transmitted data to the data server. If the data proxy module subsequently receives the first to-be-transmitted data the same as the second to-be-transmitted data that is transmitted by the SIM1 (the first subscriber identity module), the network-side device may directly discard the first to-be-transmitted data.

In some examples, when transmitting the to-be-transmitted data to the network-side device according to the dual-subscriber-identity-module time-sharing transmission strategy, the terminal device may first configure a label for the to-be-transmitted data, and distribute the to-be-transmitted data for which the label is configured to the SIM1 (the first subscriber identity module), the SIM1 (the first subscriber identity module) may be a primary card.

On this basis, the terminal device may transmit the to-be-transmitted data for which the label is configured to the network-side device by the SIM1 (the first subscriber identity module). After the network-side device receives the to-be-transmitted data for which the label is configured and that is transmitted by the terminal device by the SIM1 (the first subscriber identity module), one the one hand, the network-side device may transmit the to-be-transmitted data for which the label is configured to the data server.

On the other hand, the network-side device may determine whether a first network of the SIM1 (the first subscriber identity module) satisfies a first preset condition by a data proxy module. If it is determined that the first network of the SIM1 (the first subscriber identity module) satisfies the first preset condition, the network-side device may transmit first switch instruction information to the terminal device by the data proxy module. When receiving the first switch instruction information, the terminal device may change a data service channel from the SIM1 (the first subscriber identity module) to the SIM2 (the second subscriber identity module).

In other examples, when transmitting the to-be-transmitted data (the to-be-transmitted data includes first to-be-transmitted data and second to-be-transmitted data) to the network-side device according to a dual-subscriber-identity-module parallel transmission strategy, the terminal device may configure a first label for the first to-be-transmitted data and configure a second label for the second to-be-transmitted data, and distribute the first to-be-transmitted data for which the first label is configured to the SIM1 (the first subscriber identity module), the SIM1 (the first subscriber identity module) may be a primary card, and distribute the second to-be-transmitted data for which the second label is configured to the SIM2 (the second subscriber identity module), the SIM2 (the second subscriber identity module) may be a secondary card.

On this basis, the terminal device may transmit the first to-be-transmitted data for which the first label is configured to the network-side device by the SIM1 (the first subscriber identity module), and transmit the second to-be-transmitted data for which the second label is configured to the network-side device by the SIM2 (the second subscriber identity module). After the data proxy module of the network-side device receives the first to-be-transmitted data for which the first label is configured and the second to-be-transmitted data for which the second label is configured, the data proxy module may obtain target data by merging the first to-be-transmitted data and the second to-be-transmitted data on the basis of the first label and the second label.

In some examples, after the data proxy module of the network-side device obtains the target data, the data proxy module may transmit the target data to a data server.

Figure 5:
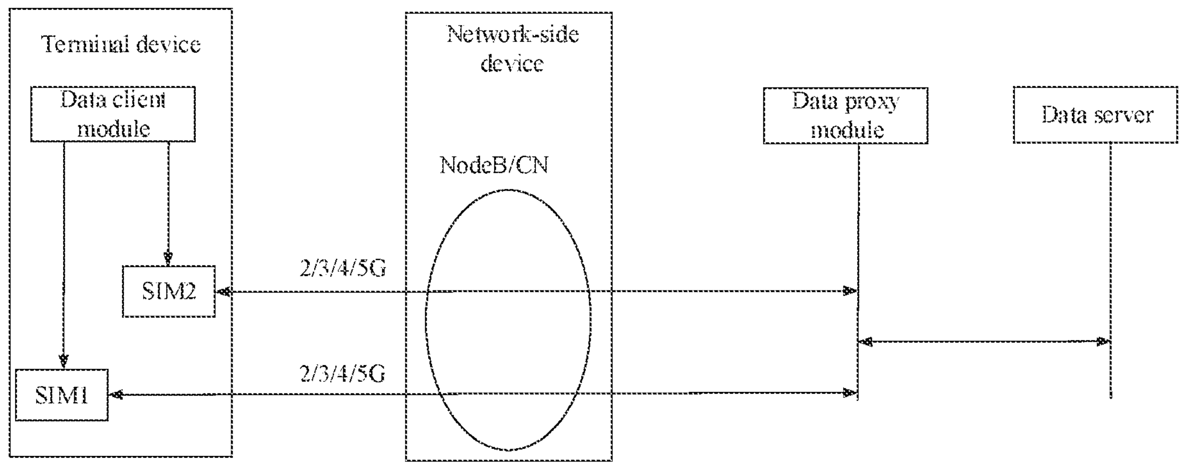
FIG. 5 shows an illustrative structural diagram of another data transmission system in a data transmission method according to an example.

It should be noted that the data proxy module in an example of the disclosure may belong to network-side devices, which is as shown in FIG. 4. In addition, the data proxy module may independently exist, which is as shown in FIG. 5. In some examples, the data proxy module may belong to data server. Where the data proxy module is specifically configured is not explicitly limited herein, and may be selected according to actual situations.

In some examples, according to the disclosure, a network-side device may be reminded of a change of a data transmission strategy corresponding to a terminal device, so as to instruct the network-side device to switch the data transmission strategy. In other words, according to an example of the disclosure, transmission strategy switch instruction information may be transmitted to the network-side device, so as to instruct the network-side device to switch the data transmission strategy according to the transmission strategy switch instruction information.

Specifically, according to the disclosure, a data service scenario corresponding to the terminal device may be transmitted to the network-side device, so as to instruct the network-side device to determine a corresponding data transmission strategy according to the data service scenario corresponding to the terminal device, and to switch the data transmission strategy.

In some examples, according to the disclosure, the data transmission strategy corresponding to the data service scenario may be transmitted to the network-side device, so as to instruct the network-side device to switch the data transmission strategy.

In some examples, according to the disclosure, transmission strategy switch instruction information may be transmitted to the network-side device, so as to instruct the network-side device to switch the data transmission strategy on the basis of a transmission strategy for to-be-transmitted data. The transmission strategy switch instruction information may be included in the to-be-transmitted data, or the transmission strategy switch instruction information may be the to-be-transmitted data, and the network-side device may determine a transmission strategy for the to-be-transmitted data after receiving the to-be-transmitted data, and switch a data transmission strategy on the basis of the transmission strategy for the to-be-transmitted data.

According to an example of the disclosure, by obtaining the data transmission strategy corresponding to the data service scenario, data may be more flexibly and effectively transmitted. Specifically, the terminal device may first determine a data service scenario corresponding to the terminal device, and obtain a data transmission strategy corresponding to the data service scenario, the data transmission strategy being capable of being implemented by scheduling the dual subscriber identity modules of the terminal device, and on this basis, the to-be-transmitted data is transmitted to the network-side device according to the data transmission strategy. According to the disclosure, by obtaining the corresponding data transmission strategy according to the data service scenario, flexibility of data transmission may be improved, and moreover, a time delay and a packet loss rate in a data transmission process may be reduced. In addition, different dual-subscriber-identity-module data transmission solutions may be selected in different data service scenarios such that uplink and downlink peak throughputs may be greatly improved, a time delay is shortened, and flexibility of data transmission may be improved to a certain extent.

Figure 6:
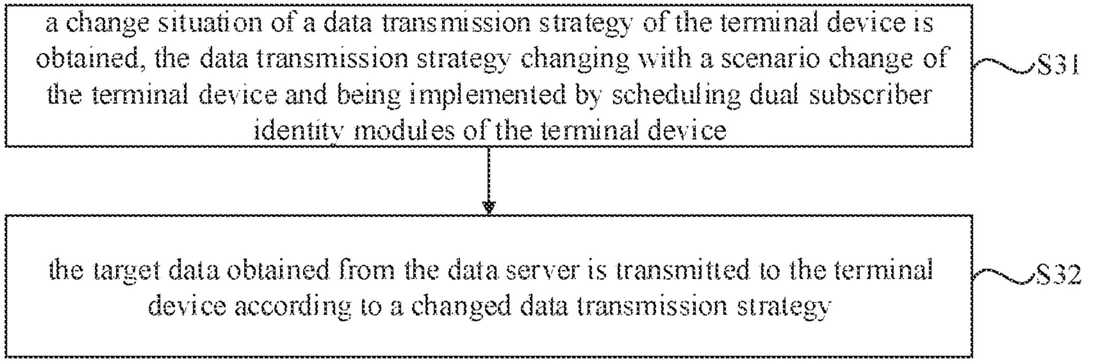
FIG. 6 shows a flow diagram of a data transmission method according to an example.

FIG. 6 shows a flow diagram of a data transmission method according to an example. As shown in FIG. 6, the data transmission method is applied to the network-side device in FIG. 1, and the method may include the following steps:

Step S31: a change situation of a data transmission strategy of the terminal device is obtained, the data transmission strategy changing with a scenario change of the terminal device and being implemented by scheduling dual subscriber identity modules of the terminal device.

In an example of the disclosure, the data transmission strategy change situation may include a change of a data service scenario, and when the network-side device obtains the data transmission strategy change situation of the terminal device, the network-side device may receive the data service scenario from the terminal device. On this basis, the network-side device may obtain the data transmission strategy corresponding to the data service scenario, and take the data transmission strategy as the data transmission strategy of the network-side device, that is, switch the data transmission strategy of the network-side device.

As an example, in the case that the data service scenario transmitted by the terminal device and received by the network-side device is a first scenario, the network-side device switches the data transmission strategy into a dual-subscriber-identity-module diversity transmission strategy, and when receiving the target data transmitted by the data server, the network-side device may transmit the target data to the terminal device according to the dual-subscriber-identity-module diversity transmission strategy. The terminal device is positioned at an edge of a cell in the first scenario.

As another example, in the case that the data service scenario transmitted by the terminal device and received by the network-side device is a second scenario, the network-side device switches the data transmission strategy into a dual-subscriber-identity-module time-sharing transmission strategy, and when receiving the target data transmitted by the data server, the network-side device may transmit the target data to the network-side device according to the dual-subscriber-identity-module time-sharing transmission strategy. The terminal device is positioned between the edge and a center of the cell in the second scenario.

As another example, in the case that the data service scenario transmitted by the terminal device and received by the network-side device is a third scenario, the network-side device switches the data transmission strategy into a dual-subscriber-identity-module parallel transmission strategy, and when receiving the target data transmitted by the data server, the network-side device may transmit the target data to the network-side device according to the dual-subscriber-identity-module parallel transmission strategy. The terminal device is positioned at the center of the cell in the third scenario.

In other examples, the data transmission strategy change situation may further include a change of the data transmission strategy, and when obtaining the data transmission strategy change situation of the terminal device, the network-side device may receive the data transmission strategy from the terminal device. On this basis, the data transmission strategy is taken as a strategy for transmitting data by the network-side device, that is, the data transmission strategy of the network-side device is switched.

As an example, in the case that the data transmission strategy received by the network-side device is the dual-subscriber-identity-module diversity transmission strategy, when receiving the target data transmitted by the data server, the network-side device may transmit the target data to the network-side device according to the dual-subscriber-identity-module diversity transmission strategy.

As another example, in the case that the data transmission strategy received by the network-side device is the dual-subscriber-identity-module time-sharing transmission strategy, when receiving the target data transmitted by the data server, the network-side device may transmit the target data to the network-side device according to the dual-subscriber-identity-module time-sharing transmission strategy.

As another example, in the case that the data transmission strategy received by the network-side device is a dual-subscriber-identity-module parallel transmission strategy, when receiving the target data transmitted by the data server, the network-side device may transmit the target data to the network-side device according to the dual-subscriber-identity-module parallel transmission strategy.

In other examples, the data transmission strategy change situation may further include a change of the to-be-transmitted data, and when obtaining the data transmission strategy change situation of the terminal device, the network-side device may receive the to-be-transmitted data from the terminal device. On this basis, a data transmission strategy for transmitting the to-be-transmitted data by the terminal device is determined, and the data transmission strategy is switched.

In some examples, the dual-subscriber-identity-module time-sharing transmission strategy may be to transmit data in turn by a better subscriber identity module selected from the first subscriber identity module and the second subscriber identity module. Specifically, when receiving the target data transmitted by the data server, the network-side device may transmit the target data to the first subscriber identity module of the terminal device, and monitor a network of the first subscriber identity module. In addition, if the network of the first subscriber identity module satisfies the first preset condition, the network-side device may execute a first switch operation, the first switch operation being used for switching a data service channel of the terminal device from the first subscriber identity module to the second subscriber identity module.

In other examples, the dual-subscriber-identity-module diversity transmission strategy is used to transmit the same data by the first subscriber identity module and the second subscriber identity module. Specifically, the network-side device may receive first target data from the data server, and generate second target data on the basis of the first target data, the second target data and the first target data being the same data packet. On this basis, according to the disclosure, the first target data may be transmitted to the first subscriber identity module of the terminal device, and the second target data may be transmitted to the second subscriber identity module of the terminal device, and the terminal device is used for storing the first target data or the second target data that is first received.

In other examples, the dual-subscriber-identity-module parallel transmission strategy is used to transmit different data in parallel by a first subscriber identity module and a second subscriber identity module. Specifically, the network-side device may receive the first target data and the second target data from the data server. The first target data and the second target data may be different data packets. On this basis, the network-side device may transmit the first target data to the first subscriber identity module of the terminal device, and transmit the second target data to the second subscriber identity module of the terminal device, and the terminal device is used for merging the first target data and the second target data.

Step S32: the target data obtained from the data server is transmitted to the terminal device according to a changed data transmission strategy.

Figure 7:
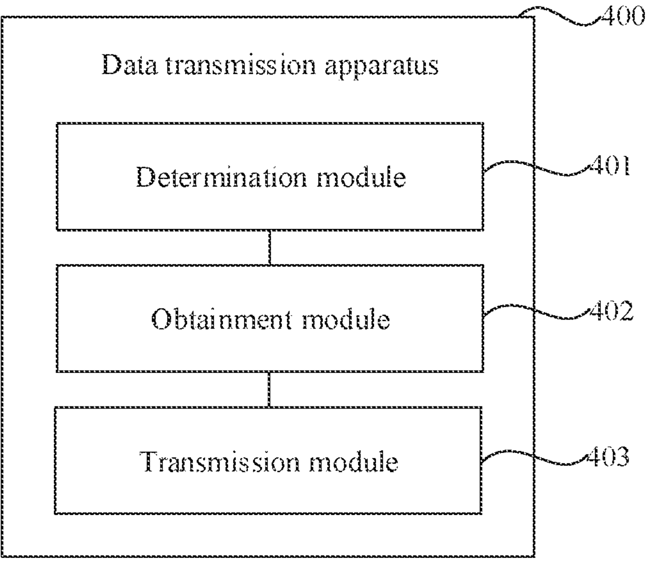
FIG. 7 shows a block diagram of a data transmission apparatus according to an example.

FIG. 7 shows a block diagram of a data transmission apparatus 400 according to an example. With reference to FIG. 7, the apparatus 400 includes a determination module 401, an obtainment module 402 and a transmission module 403.

The determination module 401 is configured to determine a data service scenario corresponding to the terminal device.

The obtainment module 402 is configured to obtain a data transmission strategy corresponding to the data service scenario, the data transmission strategy being implemented by scheduling dual subscriber identity modules of the terminal device.

The transmission module 403 is configured to transmit the to-be-transmitted data to the network-side device according to the data transmission strategy.

In some implementations, the determination module 401 may include:

- an information obtainment sub-module configured to obtain network quality information of the terminal device; and
- a scenario determination sub-module configured to determine a data service scenario corresponding to the terminal device on the basis of the network quality information.

In some implementations, the network quality information includes RSRP, and the scenario determination sub-module may be configured to take a first scenario as the data service scenario corresponding to the terminal device if the RSRP is less than a first parameter threshold, the terminal device being positioned at an edge of a cell in the first scenario.

In some implementations, dual subscriber identity modules of the terminal device include a first subscriber identity module and a second subscriber identity module. The obtainment module 402 may be configured to obtain a dual-subscriber-identity-module diversity transmission strategy corresponding to the first scenario, the dual-subscriber-identity-module diversity transmission strategy being used to transmit the same data by the first subscriber identity module and the second subscriber identity module. The transmission module 403 may be configured to transmit the to-be-transmitted data to the network-side device according to the dual-subscriber-identity-module diversity transmission strategy.

In some implementations, the transmission module 403 may be further configured to distribute the to-be-transmitted data to the first subscriber identity module and the second subscriber identity module; and transmit the to-be-transmitted data to the network-side device by the first subscriber identity module, and transmit the to-be-transmitted data to the network-side device by the second subscriber identity module, the network-side device being used for transmitting the data first received to the data server.

In some implementations, the scenario determination sub-module may be further configured to take a second scenario as the data service scenario corresponding to the terminal device if the RSRP is greater than or equal to the first parameter threshold and less than a second parameter threshold, the terminal device being positioned between the edge and a center of the cell in the second scenario.

In some implementations, dual subscriber identity modules of the terminal device includes a first subscriber identity module and a second subscriber identity module, and the obtainment module 402 may be configured to obtain a dual-subscriber-identity-module time-sharing transmission strategy corresponding to the second scenario, the dual-subscriber-identity-module time-sharing transmission strategy being used to transmit data in turn by a better subscriber identity module selected from the first subscriber identity module and the second subscriber identity module. The transmission module 403 may be further configured to transmit the to-be-transmitted data to the network-side device according to the dual-subscriber-identity-module time-sharing transmission strategy.

In some implementations, the transmission module 403 may be further configured to distribute the to-be-transmitted data to the first subscriber identity module, and transmit the to-be-transmitted data to the network-side device by the first subscriber identity module, so as to instruct the network-side device to monitor a network of the first subscriber identity module; receive first switch instruction information transmitted by the network-side device, the first switch instruction information being transmitted by the network-side device under the condition that the network-side device determines that the network of the first subscriber identity module satisfies a first preset condition; and execute a first switch operation, the first switch operation being configured to change a data service channel of the terminal device from the first subscriber identity module to the second subscriber identity module.

In some implementations, the first preset condition includes a condition that a first time delay of transmitting the to-be-transmitted data by the first subscriber identity module is greater than a preset time delay, and/or a condition that a first packet loss rate of transmitting the to-be-transmitted data by the first subscriber identity module is greater than a preset packet loss rate.

In some implementations, the scenario determination sub-module may be further configured to take a third scenario as the data service scenario corresponding to the terminal device if the RSRP is greater than or equal to the second parameter threshold, the terminal device being positioned at a center of the cell in the third scenario.

In some implementations, dual subscriber identity modules of the terminal device include a first subscriber identity module and a second subscriber identity module, and the transmission module 402 may be further configured to obtain a dual-subscriber-identity-module parallel transmission strategy corresponding to the third scenario, the dual-subscriber-identity-module parallel transmission strategy being used to transmit different data in parallel by the first subscriber identity module and the second subscriber identity module. The transmission module 403 may be further configured to transmit the to-be-transmitted data to the network-side device according to the dual-subscriber-identity-module parallel transmission strategy.

In some implementations, the to-be-transmitted data includes first to-be-transmitted data and second to-be-transmitted data, and the data transmission system further includes a data server. The transmission module 403 may be further configured to distribute the first to-be-transmitted data to the first subscriber identity module, and distribute the second to-be-transmitted data to the second subscriber identity module; and transmit the first to-be-transmitted data to the network-side device by the first subscriber identity module, and transmit the second to-be-transmitted data to the network-side device by the second subscriber identity module, the network-side device being used for obtaining target data by merging the first to-be-transmitted data and the second to-be-transmitted data, and being used for transmitting the target data to the data server.

In some implementations, the RSRP is RSRP corresponding to LTE or RSRP corresponding to NR.

In some implementations, the network quality information further includes SNR.

In some implementations, the data transmission apparatus 400 may further include:

a change module configured to remind the network-side device of a change of the data transmission strategy corresponding to the terminal device, so as to instruct the network-side device to switch the data transmission strategy.

In some implementations, the change module may include:

a first change sub-module configured to transmit the data service scenario corresponding to the terminal device to the network-side device, so as to instruct the network-side device to determine a corresponding data transmission strategy according to the data service scenario corresponding to the terminal device, and switch the data transmission strategy;

a second change sub-module configured to transmit the data transmission strategy corresponding to the data service scenario to the network-side device, so as to instruct the network-side device to switch the data transmission strategy; or a third change sub-module configured to transmit transmission strategy switch instruction information to the network-side device, so as to instruct the network-side device to change a data transmission strategy on the basis of a transmission strategy for to-be-transmitted data.

Figures 8, 9:
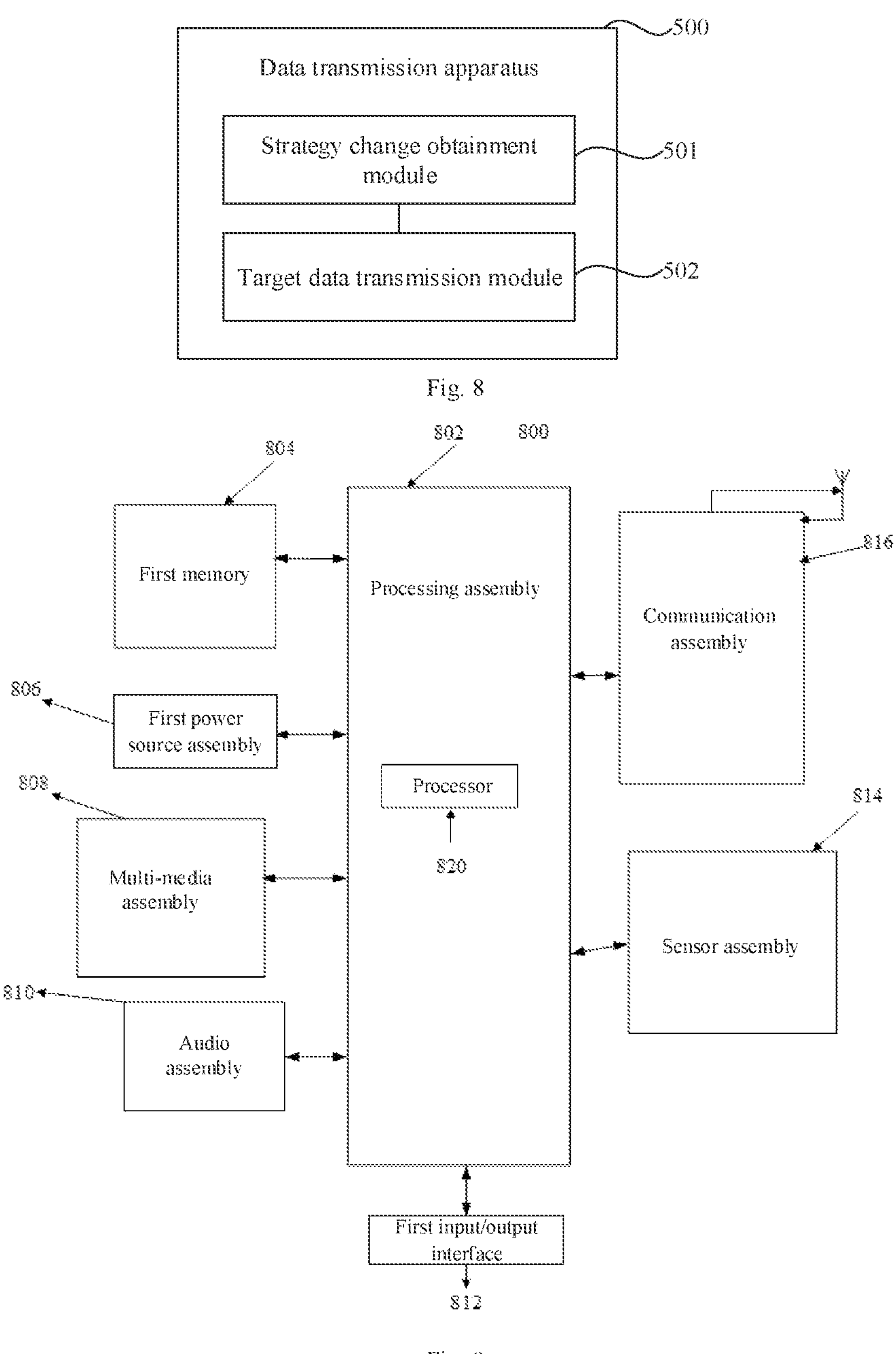
FIG. 8 shows a block diagram of a data transmission apparatus according to an example.
FIG. 9 shows a block diagram of a terminal device according to an example.

FIG. 8 shows a block diagram of a data transmission apparatus 500 according to an example. With reference to FIG. 8, the apparatus 500 includes a strategy change obtainment module 501 and a target data transmission module 502.

The strategy change obtainment module 501 is configured to obtain a change situation of a data transmission strategy of the terminal device, the data transmission strategy changing with a scenario change of the terminal device and being implemented by scheduling dual subscriber identity modules of the terminal device; and the target data transmission module 502 is configured to transmit target data to the terminal device according to a changed data transmission strategy.

In some implementations, the strategy change obtainment module 501 may be configured to receive a data service scenario from the terminal device; and determine a corresponding data transmission strategy according to the data service scenario corresponding to the terminal device, and switch the data transmission strategy.

In some implementations, the strategy change obtainment module 501 may be further configured to receive the data transmission strategy from the terminal device, and switch the data transmission strategy.

In some implementations, the strategy change obtainment module 501 may be further configured to receive to-be-transmitted data from the terminal device; and determine a data transmission strategy for transmitting the to-be-transmitted data by the terminal device, and switch the data transmission strategy.

For the apparatus in the above examples, a specific method for each module to execute an operation is described in detail in examples relating to the method, and will not be described in detail herein.

The disclosure further provides a computer-readable storage medium storing a computer program instruction, and the program instruction implements the steps of the data transmission methods provided in the disclosure when executed by a processor.

FIG. 9 shows a block diagram of a terminal device 800 for data transmission shown according to an example. For example, the terminal device 800 may be a mobile phone, a computer, a digital broadcasting terminal, a message receiving and transmitting device, a game console, a tablet device, a medical device, a fitness device, a personal digital assistant, etc.

With reference to FIG. 9, the terminal device 800 may include one or more of the following assemblies: a network-side device processing assembly 802, a first memory 804, a first power source assembly 806, a multi-media assembly 808, an audio assembly 810, a first input/output interface 812, a sensor assembly 814 and a communication assembly 816.

The network-side device processing assembly 802 typically controls the overall operation of the terminal device 800, such as operations associated with display, telephone calls, data communications, camera operations and recording operations. The network-side device processing assembly 802 may include one or more processors 820 to execute an instruction, so as to complete all or part of the steps of the above method. Moreover, the network-side device processing assembly 802 may include one or more modules that facilitate interaction between the network-side device processing assembly 802 and other assemblies. For example, the network-side device processing assembly 802 may include a multi-media module, so as to facilitate interaction between multi-media assembly 808 and the network-side device processing assembly 802.

The first memory 804 is configured to store various types of data, so as to support operations at the terminal device 800. Examples of such data include an instruction for any application or method operating on the terminal device 800, contact data, phonebook data, messages, pictures, videos, etc. The first memory 804 may be realized by any type of volatile or non-volatile storage devices or combinations thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The first power source assembly 806 provides power for various assemblies of the terminal device 800. The first power source assembly 806 may include a power source management system, one or more power sources, and other assemblies associated with generating, management and power distribution of the terminal device 800.

The multi-media assembly 808 includes a screen that provides an output interface between the terminal device 800 and the user. In some examples, the screen may include a liquid crystal display (LCD) and a touch panel (TP). Under the condition that the screen includes a touch panel, the screen may be realized as a touch screen, so as to receive an input signal from a user. The touch panel includes one or more touch sensors, so as to sense touches, swipes, and gestures on the touch panel. The touch sensor may not only sense a boundary of a touch or swipe, but also detect time and pressure associated with the touch or swipe. In some examples, the multi-media assembly 808 includes a front facing camera and/or a rear facing camera. When the terminal device 800 is in an operating mode, such as a shooting mode or a video mode, the front facing camera and/or the rear facing camera may receive external multi-media data. Each of the front facing camera and the rear facing camera may be a fixed optical lens system or have focusing and optical zooming capabilities.

The audio assembly 810 is configured to output and/or input audio signals. For example, the audio assembly 810 includes a microphone (MIC) that is configured to receive external audio signals when the terminal device 800 is in an operating mode, such as a call mode, a recording mode, and a voice recognition mode. The received audio signals may be further stored in the first memory 804 or transmitted by the communication assembly 816. In some examples, the audio assembly 810 further includes a loudspeaker for outputting audio signals.

The first input/output interface 812 provides an interface between the processing assembly 802 of the network-side device and peripheral interface modules, such as keyboards, click wheels and buttons. These buttons may include, but are not limited to: home buttons, volume buttons, start buttons, and lock buttons.

The sensor assembly 814 may include one or more sensors for providing status assessment of various aspects of the terminal device 800. For example, the sensor assembly 814 may detect an open/closed state of the terminal device 800, and relative positioning of assemblies, for example, a display and keypad of the terminal device 800. The sensor assembly 814 may further detect a change in position of the terminal device 800 or an assembly of the terminal device 800, presence or absence of contact between a user and the terminal device 800, orientation or acceleration/deceleration of the terminal device 800, and a temperature change of the terminal device 800. The sensor assembly 814 may include a proximity sensor configured to detect the presence of a nearby object in the absence of any physical contact. The sensor assembly 814 may further include a light sensor, such as a complementary metal oxide semiconductor (CMOS) or charge coupled device (CCD) image sensor for being used in imaging applications. In some examples, the sensor assembly 814 may further include an acceleration sensor, a gyroscopic sensor, a magnetic sensor, a pressure sensor, or a temperature sensor.

The communication assembly 816 is configured to facilitate wired or wireless communication between the terminal device 800 and other devices. The terminal device 800 may access a wireless network based on a communication standard, such as Wi-Fi, 2G, 3G, or a combination thereof. In an example, the communication assembly 816 receives a broadcast signal or broadcast related information from an external broadcast management system by a broadcast channel. In an example, the communication assembly 816 further includes a near-field communication (NFC) module, so as to facilitate short-range communication. For example, the NFC module may be realized on the basis of a radio frequency identification (RFID) technology, an infrared data association (IrDA) technology, an ultra wideband (UWB) technology, a Bluetooth (BT) technology, and other technologies.

In an example, the terminal device 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, so as to be used for executing the above methods.

An example further provides a non-transitory computer-readable storage medium including an instruction, such as a first memory 804 including an instruction, and the instruction may be executed by the processor 820 of the terminal device 800, so as to implement the above method. For example, the non-transitory computer-readable storage medium may be the read-only memories (ROMs), random access memories (RAMs), compact disc read-only memories (CD-ROMs), magnetic tapes, floppy disks, optical data storage devices, etc.

The above apparatus may be an independent terminal device, or may be part of an independent terminal device. For example, in an example, the apparatus may be an integrated circuit (IC) or a chip, and the IC may be one IC or a set of a plurality of ICs; and the chip may include, but is not limit to, the following categories: a graphics processing unit (GPU), a central processing unit (CPU), a field programmable gate array (FPGA), a digital signal processor (DSP), an application specific integrated circuit (ASIC), a system on chip (SOC), etc. The above integrated circuit or chip may be used for executing executable instructions (or codes), so as to implement the above data transmission method. The executable instructions may be stored in the integrated circuit or chip or retrieved from other apparatuses or devices, for example, an integrated circuit or chip includes a processor, memory, and interfaces for being in communication with other apparatuses. The executable instructions may be stored in the processor, and implement the above data transmission method when executed by the processor; alternatively, the integrated circuit or chip may receive the executable instructions through the interface and transmit the executable instructions to the processor for execution, so as to implement the above data transmission method.

Another example provides a computer program product. The computer program product includes a computer program executable by a programmable apparatus, and the computer program has code portions for executing the above data transmission method when executed by the programmable apparatus.

Figure 10:
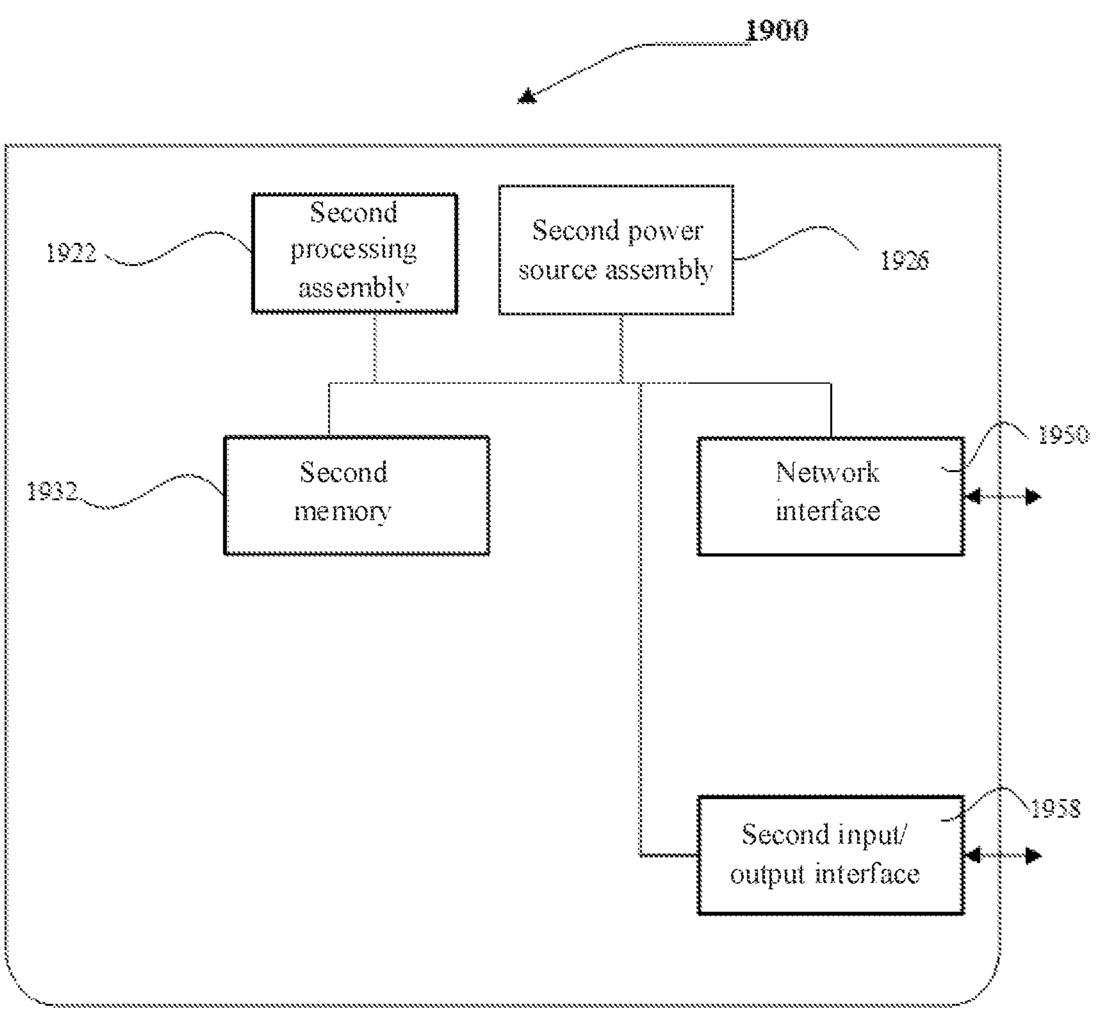
FIG. 10 shows a block diagram of a network-side device according to an example.

FIG. 10 shows a block diagram of a network-side device 1900 for a data transmission method according to an example. For example, the network-side device 1900 may be provided as a data server. With reference to FIG. 10, the network-side device 1900 includes a second processing assembly 1922, which further includes one or more processors, and memory resources represented by a second memory 1932 for storing instructions that may be executed by the second processing assembly 1922, such as applications. The applications stored in the second memory 1932 may include one or more modules that each correspond to a set of instructions. In addition, the second processing assembly 1922 is configured to execute instructions, so as to execute the above data transmission method.

The network-side device 1900 may further include a second power source assembly 1926 configured to execute power source management of the network-side device 1900, a wired or wireless network interface 1950 configured to connect the network-side device 1900 with a network, and a second input/output interface 1958. The network-side device 1900 may operate an operating system stored in the second memory 1932, such as Windows Server™, Mac OS X™, Unix™, Linux™, FreeBSD™ and similar systems.

A person skilled in the art could easily conceive of other implementation solutions of the disclosure upon consideration of the description and the disclosure disclosed in the implementation. The disclosure is intended to cover any variations, uses or adaptive changes of the disclosure, which follow the general principles of the disclosure and include common general knowledge or customary technical means in the art that is not disclosed in the disclosure. The description and the examples are to be regarded as illustrative merely, and the true scope and spirit of the disclosure are indicated by the following claims.

It should be understood that the disclosure is not limited to a precise structure that has been described above and illustrated in the accompanying drawings, and can have various modifications and changes without departing from the its scope. The scope of the disclosure is limited by the appended claims only.

The invention claimed is:

1. A data transmission method, applied to a terminal device of a data transmission system, wherein the data transmission system further comprises a network-side device, and the method comprises:

determining a data service scenario corresponding to the terminal device;

obtaining a data transmission strategy corresponding to the data service scenario, the data transmission strategy being implemented by scheduling dual subscriber identity modules of the terminal device; and transmitting to-be-transmitted data to the network-side device according to the data transmission strategy;

wherein the determining a data service scenario corresponding to the terminal device comprises:

obtaining network quality information of the terminal device; and determining the data service scenario corresponding to the terminal device based on the network quality information;

wherein the network quality information comprises reference signal received power (RSRP), and the determining the data service scenario corresponding to the terminal device based on the network quality information comprises:

taking a first scenario as the data service scenario corresponding to the terminal device under a condition that the RSRP is less than a first parameter threshold, the terminal device being positioned at an edge of a cell in the first scenario;

wherein dual subscriber identity modules of the terminal device comprise a first subscriber identity module and a second subscriber identity module; and the obtaining a data transmission strategy corresponding to the data service scenario and the transmitting to-be-transmitted data to the network-side device according to the data transmission strategy comprise:

obtaining a dual-subscriber-identity-module diversity transmission strategy corresponding to the first scenario, the dual-subscriber-identity-module diversity transmission strategy being used to transmit the same data by the first subscriber identity module and the second subscriber identity module; and transmitting the to-be-transmitted data to the network-side device according to the dual-subscriber-identity-module diversity transmission strategy;

wherein the data transmission system further comprises a data server; and the transmitting the to-be-transmitted data to the network-side device according to the dual-subscriber-identity-module diversity transmission strategy comprises:

distributing the to-be-transmitted data to the first subscriber identity module and the second subscriber identity module; and transmitting the to-be-transmitted data to the network-side device by the first subscriber identity module, and transmitting the to-be-transmitted data to the network-side device by the second subscriber identity module, the network-side device being used for transmitting the data first received to the data server.

2. The data transmission method according to claim 1, further comprising:

taking a second scenario as the data service scenario corresponding to the terminal device under a condition that the RSRP is greater than or equal to the first parameter threshold and less than a second parameter threshold, the terminal device being positioned between the edge and a center of the cell in the second scenario; or taking a third scenario as the data service scenario corresponding to the terminal device under a condition that the RSRP is greater than or equal to the second parameter threshold, the terminal device being positioned at a center of the cell in the third scenario.

3. The data transmission method according to claim 2, wherein the obtaining a data transmission strategy corresponding to the data service scenario and the transmitting to-be-transmitted data to the network-side device according to the data transmission strategy comprise:

obtaining a dual-subscriber-identity-module time-sharing transmission strategy corresponding to the second scenario, the dual-subscriber-identity-module time-sharing transmission strategy being used to transmit data in turn by a better subscriber identity module selected from the first subscriber identity module and the second subscriber identity module;

transmitting the to-be-transmitted data to the network-side device according to the dual-subscriber-identity-module time-sharing transmission strategy; or obtaining a dual-subscriber-identity-module parallel transmission strategy corresponding to the third scenario, the dual-subscriber-identity-module parallel transmission strategy being used to transmit different data in parallel by the first subscriber identity module and the second subscriber identity module;

transmitting the to-be-transmitted data to the network-side device according to the dual-subscriber-identity-module parallel transmission strategy.

4. The data transmission method according to claim 3, wherein the transmitting the to-be-transmitted data to the network-side device according to the dual-subscriber-identity-module time-sharing transmission strategy comprises:

distributing the to-be-transmitted data to the first subscriber identity module, transmitting the to-be-transmitted data to the network-side device by the first subscriber identity module, and instructing the network-side device to monitor a network of the first subscriber identity module;

receiving first switch instruction information transmitted by the network-side device, the first switch instruction information being transmitted by the network-side device in response to determining that the network-side device determines that the network of the first subscriber identity module satisfies a first preset condition; and executing a first switch operation, the first switch operation being used for switching a data service channel of the terminal device from the first subscriber identity module to the second subscriber identity module.

5. The data transmission method according to claim 4, wherein the first preset condition comprises a condition that a first time delay of transmitting the to-be-transmitted data by the first subscriber identity module is greater than a preset time delay, and/or a condition that a first packet loss rate of transmitting the to-be-transmitted data by the first subscriber identity module is greater than a preset packet loss rate.

6. The data transmission method according to claim 3, wherein the to-be-transmitted data comprises first to-be-transmitted data and second to-be-transmitted data, the data transmission system further comprises a data server, and the transmitting the to-be-transmitted data to the network-side device according to the dual-subscriber-identity-module parallel transmission strategy comprises:

distributing the first to-be-transmitted data to the first subscriber identity module, and distributing the second to-be-transmitted data to the second subscriber identity module; and transmitting the first to-be-transmitted data to the network-side device by the first subscriber identity module, and transmitting the second to-be-transmitted data to the network-side device by the second subscriber identity module, the network-side device being used for obtaining target data by merging the first to-be-transmitted data and the second to-be-transmitted data, and being used for transmitting the target data to the data server.

7. The data transmission method according to claim 1, wherein the RSRP is RSRP corresponding to long term evolution (LTE) or RSRP corresponding to new radio (NR).

8. The data transmission method according to claim 1, further comprising:

reminding the network-side device of a change of the data transmission strategy corresponding to the terminal device, so as to instruct the network-side device to switch the data transmission strategy.

9. The data transmission method according to claim 8, wherein the reminding the network-side device of a change of the data transmission strategy corresponding to the terminal device, so as to instruct the network-side device to switch the data transmission strategy comprises:

transmitting the data service scenario corresponding to the terminal device to the network-side device, so as to instruct the network-side device to determine a corresponding data transmission strategy according to the data service scenario corresponding to the terminal device and to switch the data transmission strategy;

transmitting the data transmission strategy corresponding to the data service scenario to the network-side device, so as to instruct the network-side device to switch the data transmission strategy; or transmitting transmission strategy switch instruction information to the network-side device, so as to instruct the network-side device to switch the data transmission strategy based on a transmission strategy for the to-be-transmitted data.

10. A data transmission method, applied to a network-side device of a data transmission system, wherein the data transmission system further comprises a terminal device and a data server, and the method comprises:

obtaining a change situation of a data transmission strategy of the terminal device, the data transmission strategy changing with a data service scenario change of the terminal device and being implemented by scheduling dual subscriber identity modules of the terminal device; and transmitting target data obtained from the data server to the terminal device according to a changed data transmission strategy;

wherein the data service scenario is determined by obtaining network quality information of the terminal device, and determining the data service scenario corresponding to the terminal device based on the network quality information; and the network quality information comprises reference signal received power (RSRP), and taking a first scenario as the data service scenario corresponding to the terminal device under a condition that the RSRP is less than a first parameter threshold, the terminal device being positioned at an edge of a cell in the first scenario;

wherein dual subscriber identity modules of the terminal device comprise a first subscriber identity module and a second subscriber identity module; and transmitting target data obtained from the data server to the terminal device according to a changed data transmission strategy comprise:

obtaining a dual-subscriber-identity-module diversity transmission strategy corresponding to the first scenario, the dual-subscriber-identity-module diversity transmission strategy being used to transmit the same data by the first subscriber identity module and the second subscriber identity module; and transmitting the target data obtained from the server to the terminal device according to the dual-subscriber-identity-module diversity transmission strategy;

wherein transmitting the target data obtained from the server to the terminal device according to the dual-subscriber-identity-module diversity transmission strategy comprise:

generating second target data according to first target data, the first target data being the target data, and the first target data and the second target data being the same; and sending the first target data to the first subscriber identity module, and sending the second target data to the second subscriber identity module, the terminal device being used for saving data first received.

11. The data transmission method according to claim 10, wherein the obtaining a change situation of a data transmission strategy of the terminal device comprises:

receiving a data service scenario from the terminal device; determining a corresponding data transmission strategy according to the data service scenario corresponding to the terminal device, and switching the data transmission strategy; or receiving the data transmission strategy from the terminal device, and switching the data transmission strategy.

12. The data transmission method according to claim 11, wherein the obtaining a change situation of a data transmission strategy of the terminal device further comprises:

receiving to-be-transmitted data from the terminal device; and determining a data transmission strategy for transmitting the to-be-transmitted data by the terminal device, and switching the data transmission strategy.

13. A terminal device, comprising:

a first processor; and a first memory for storing executable instruction of the first processor; wherein the first processor is configured to execute the executable instruction to:

determine a data service scenario corresponding to the terminal device;

obtain a data transmission strategy corresponding to the data service scenario, the data transmission strategy being implemented by scheduling dual subscriber identity modules of the terminal device; and transmit to-be-transmitted data to a network-side device according to the data transmission strategy;

wherein the determining a data service scenario corresponding to the terminal device comprises:

obtaining network quality information of the terminal device; and determining the data service scenario corresponding to the terminal device based on the network quality information;

wherein the network quality information comprises reference signal received power (RSRP), and the determining the data service scenario corresponding to the terminal device based on the network quality information comprises:

taking a first scenario as the data service scenario corresponding to the terminal device under a condition that the RSRP is less than a first parameter threshold, the terminal device being positioned at an edge of a cell in the first scenario;

wherein dual subscriber identity modules of the terminal device comprise a first subscriber identity module and a second subscriber identity module; and the obtaining a data transmission strategy corresponding to the data service scenario and the transmitting to-be-transmitted data to the network-side device according to the data transmission strategy comprise:

obtaining a dual-subscriber-identity-module diversity transmission strategy corresponding to the first scenario, the dual-subscriber-identity-module diversity transmission strategy being used to transmit the same data by the first subscriber identity module and the second subscriber identity module; and transmitting the to-be-transmitted data to the network-side device according to the dual-subscriber-identity-module diversity transmission strategy;

wherein the data transmission system further comprises a data server; and the transmitting the to-be-transmitted data to the network-side device according to the dual-subscriber-identity-module diversity transmission strategy comprises:

distributing the to-be-transmitted data to the first subscriber identity module and the second subscriber identity module; and transmitting the to-be-transmitted data to the network-side device by the first subscriber identity module, and transmitting the to-be-transmitted data to the network-side device by the second subscriber identity module, the network-side device being used for transmitting the data first received to the data server.

14. A network-side device, comprising:

a second processor; and a second memory for storing executable instruction of the second processor;

wherein the second processor is configured to execute the executable instruction, so as to implement the data transmission method of claim 10.

15. A non-transitory computer-readable storage medium, storing a computer program instruction, wherein the computer program instruction implements the data transmission method of claim 1 in response to being executed by a processor.

16. A chip, comprising a processor and an interface, wherein the processor is used for reading an instruction, so as to execute the data transmission method of claim 1.

* * * * *